United States Patent [19]

Liebl

[11] Patent Number: 4,795,307

[45] Date of Patent: Jan. 3, 1989

[54] METHOD AND APPARATUS FOR OPTIMIZING THE VANE CLEARANCE IN A MULTI-STAGE AXIAL FLOW COMPRESSOR OF A GAS TURBINE

[75] Inventor: Josef Liebl, Dachau, Fed. Rep. of Germany

[73] Assignee: MTU Motoren- und Turbinen-Union Munchen GmbH, Munich, Fed. Rep. of Germany

[21] Appl. No.: 20,028

[22] Filed: Feb. 27, 1987

[30] Foreign Application Priority Data

Feb. 28, 1986 [DE] Fed. Rep. of Germany ....... 3606597

[51] Int. Cl.$^4$ .............................................. F02C 7/16
[52] U.S. Cl. .................................... 415/115; 415/116; 416/97 R
[58] Field of Search ............. 415/115, 116; 416/97 R

[56] References Cited

U.S. PATENT DOCUMENTS

| | | |
|---|---|---|
| 2,628,066 | 2/1953 | Lombard et al. ...................... 416/97 |
| 2,656,147 | 10/1953 | Brownhill et al. ..................... 416/97 |
| 3,647,313 | 3/1972 | Koff .................................... 415/116 |
| 3,742,706 | 7/1973 | Klompas ............................. 416/216 |
| 3,844,110 | 10/1974 | Widlansky ......................... 60/39.08 |
| 3,957,391 | 5/1976 | Vollinger ............................. 415/116 |
| 4,127,988 | 12/1978 | Becker ................................ 415/116 |
| 4,329,114 | 5/1982 | Johnston et al. .................... 60/39.07 |
| 4,338,061 | 7/1982 | Beitler et al. ........................ 415/175 |
| 4,576,547 | 3/1986 | Weiner et al. . |

Primary Examiner—Henry A. Bennet
Attorney, Agent, or Firm—Roberts, Spiecens & Cohen

[57] ABSTRACT

A method and apparatus for optimizing the radial clearance of rotor and stator vanes with their opposed structure for axial flow compressors of gas turbine power plants in which rotor disks are vented and thermally controlled by compressed air taken from the main flow path in the compressor via openings in the inner surface of the main flow path at one or more of the compressor stages. The removed air is supplied to annular spaces formed between rotor and/or seal support disks.

22 Claims, 3 Drawing Sheets

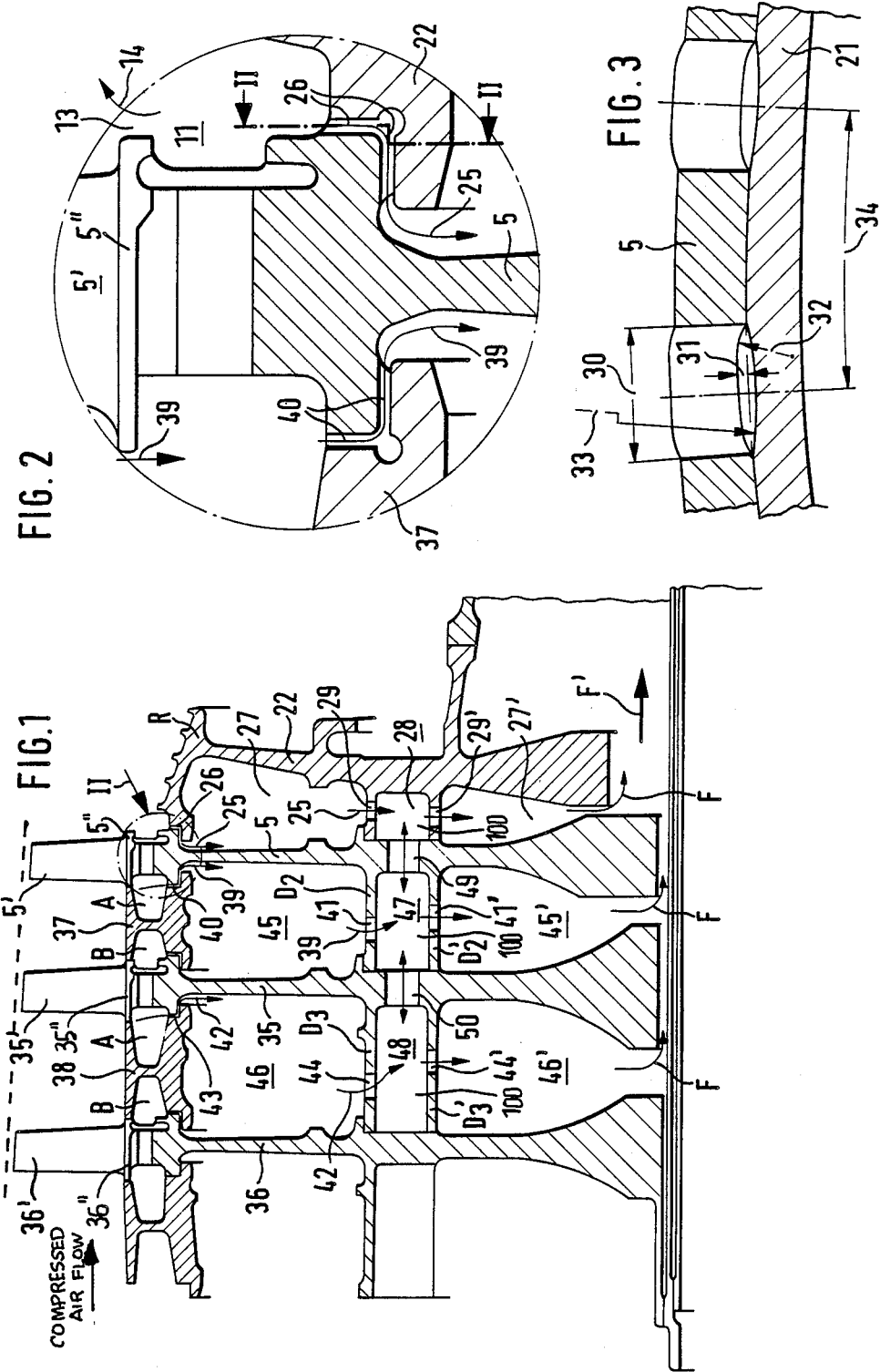

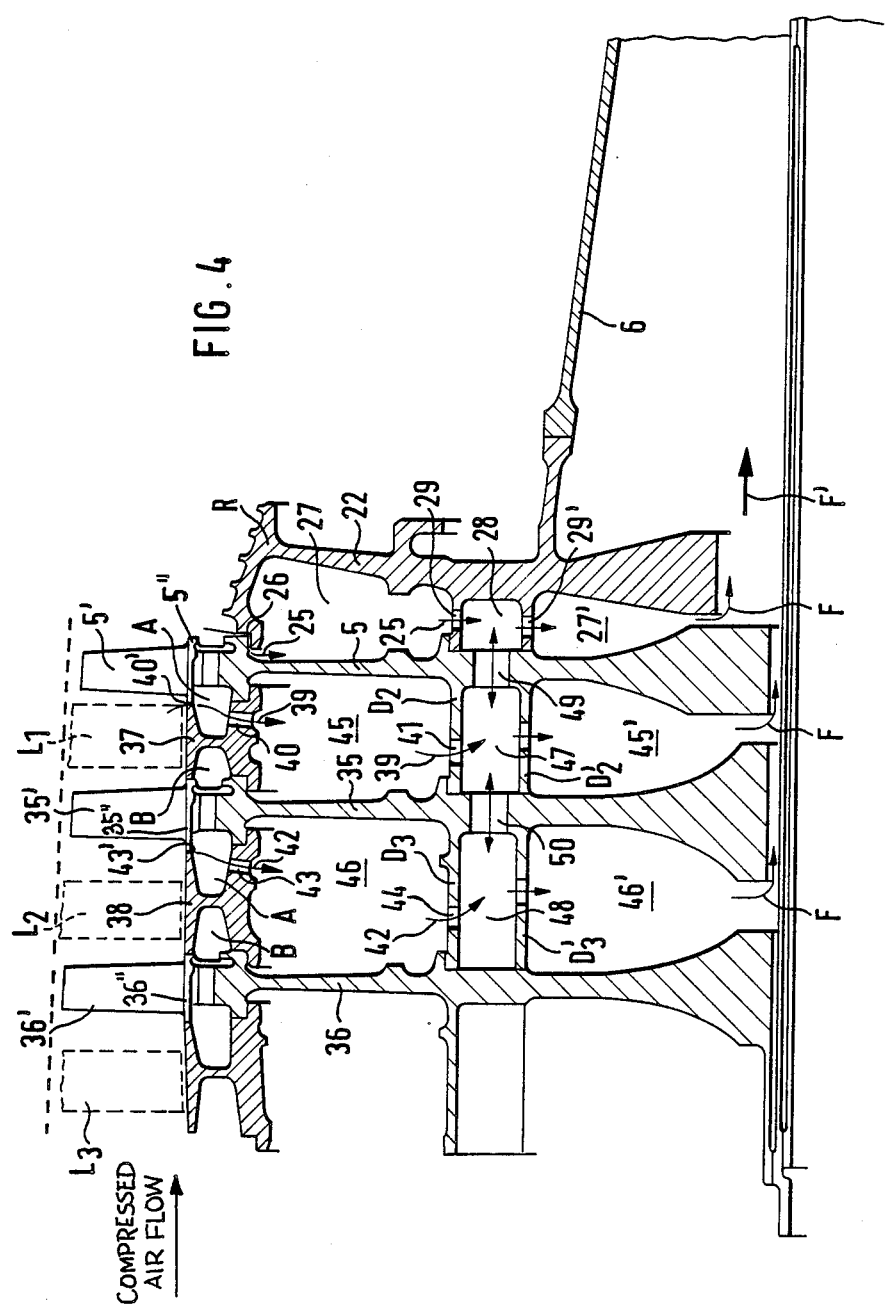

METHOD AND APPARATUS FOR OPTIMIZING THE VANE CLEARANCE IN A MULTI-STAGE AXIAL FLOW COMPRESSOR OF A GAS TURBINE

FIELD OF THE INVENTION

The invention relates to the optimization of the clearance between the vanes and adjacent structure in a multistage axial flow compressor of a gas turbine power plant and particularly to the thermal control of the rotor disks of the compressor to achieve such optimization.

More particularly, the invention relates to methods and apparatus for venting compressed air from the compressor at least at one of the stages thereof for the thermal control.

BACKGROUND AND PRIOR ART

The rotors and housings of turbo machines, such as steam turbines, compressors, gas turbines and the like are generally designed on the basis of strength and/or weight, and housings of relatively small mass are opposite rotors of relatively large mass. The following characteristics result from this:

An optimal clearance of, for instance, a few hundredths of a millimeter can be provided for the radial rotor and stator guide vanes or blades only for a specific load condition. Other load conditions must be carried out with radial slot sizes based on the above optimizing design. However, the slot size varies not only for load conditions, but also between cold and hot conditions and in the thermal transition behavior of the rotor and stator between different loading conditions;

In the event of excessive differences in the thermal transition behavior it may be necessary to make the "optimum" radial slot larger in order to avoid, in certain transient conditions, a radial scraping of the rotor and stator guide vanes with their respective opposed structure;

The above is also important in the construction and sizing of the slots of radial seals.

As a result of this conventional construction, there are a number of disadvantages as noted hereafter:

Loss of power and efficiency, or increased consumption of fuel for load conditions which differ from that for which the slot sizes were optionally designed;

Loss of power and efficiency, or increased consumption of fuel during transition states or non-uniform operating conditions;

Susceptibility to compressor pumping, particularly during starting and acceleration.

In order to provide a margin of safety in light of the varying conditions, it is known from U.S. Pat. No. 4,329,114 to provide a radial slot control device, which is adjustable as a function of engine output parameters, for compressors of gas turbine engines In the patent there is disclosed a construction in which air taken from a relatively "cold" region of the compressor is selectively diverted, by a flap control valve on the outer casing, to flow either in entirety or in part along the outside of the corresponding inner stator vane support structure, and therefore over an axial length from the region of air removal approximately to the last compressor stage.

In another system for controlling the clearance between vanes or blades and opposite structure for compressors of gas turbine engines, U.S. Pat. No. 4,338,061 shows a system operating predominantly electronically and including a mechanical control valve by which relatively cold air is bled for turbine cooling or control of internal leakage. The cold air is bled from a comparatively early compressor stage, for instance, from the fifth compressor stage as a by-pass flow mainly for control of the size of the radial slot due to blade clearance. In this regard, the bleed point communicates both with an outer first flow path extending along the compressor housing up to the last compressor stage and with a second flow path extending parallel to the latter. The mechanical control valve controls a variable passage of air through both flow paths and thus provides cooling of variable intensity of the outer housing. The optimal position of the control valve for the specific operating condition is representative of the size of the radial slot actually required at the time, as calculated by a computer system, using pertinent engine parameters based on the difference between the actual temperature and the desired temperature of the housing as predetermined for the condition of particular operation.

The following disadvantages result from the systems of the two U.S. Patents described above:

An expensive electronic construction is required;

Expensive air guides and control means are required;

A comparatively large increase in weight is obtained by the added structure;

A larger engine diameter is required, particularly in the region of the compressor;

It is necessary to tap off comparatively large amounts of compressed air which compromises the compression; and As a whole, considerable susceptibility to turbulence is produced.

From the journal "INTERAVIA," 2 (February), 1983, page 102, middle column, last paragraph, there is known, by itself, a so-called "active" slot control for the compressor of a gas turbine engine by introduction of hot air into the corresponding compressor rotor.

U.S. patent application Ser. No. 758,049, filed: 7/23/85 provides an apparatus for optimizing the size of the slot or clearance of the rotor and stator vanes in axial flow compressors of gas turbine power plants to conduct a leakage air stream, discharged from the main compressor seal in the region of the end of the compressor in a direction opposite the main direction of air flow in the compressor towards tee last and the penultimate rotor disks whereafter the air is discharged for further use, for example, for cooling purposes.

This has the disadvantage that the amount of removal air is dependent on the slot behavior of the seal which varies in accordance with load. Such seals are generally constructed as labyrinth seals. Therefore, the quantity of leakage air is subject to relatively great variation and the desired continuous effectiveness of heating of the rotor parts cannot be obtained. Particularly during transient or non-uniform operation and especially for relatively small sizes of the slot of the main seal, the required quantity of removal air can no longer be obtained in sufficient amount.

Another significant disadvantage of the above-discussed construction is that the leakage air flowing from the main seal and used for the local heating or venting of structural parts has a relatively high temperature. In this respect, the compressed air at relatively high temperature which flows from the last compressor stage through the main seal undergoes an additional increase in temperature as a result of additional air friction between rotating and stationary parts of the main seal. There may also be other increases i the air temperature due to air friction between a stationary guide wall, such as the outer wall of a combustion chamber and a rotating support disk which supports the rotating part of the seal. Consequently, at the least the last three rotor disks are contacted by substantially the same relatively hot air in the region of their greatest mass close to the axis of rotation of the rotor. Hence, a locally precise thermal control of the compressor rotor for optimization of the radial slots proportional to the continuous increase in temperature of the compressed air flow in the compressor is not assured.

Further U.S. Pat. Nos. 3,742,706 (Klompas) and 3,844,110 (Widlansky et al) provide—among others—a combined compressor/turbine/cooling arrangement for a gas turbine engine wherein relatively cool air is taped off at an upstream stage from the compressor and is conducted at a greatly reduced temperature against adjacent disks of the compressor rotor. In other words there is no possibility to heat up the rotor disks of the compressor to temperature levels which follow the continuous increase in temperature of the compressed air flow in the compressor.

SUMMARY OF THE INVENTION

An object of the present invention is to provide a method and apparatus which eliminates the disadvantages referred to in respect of the prior art while at the same time being of relatively simple construction, assures the locally required venting temperature and quantity even for abrupt changes in load.

The apparatus, according to the invention, is characterized by a construction in which an opening is provided in the inner bounding surface of the flow channel of the compressed air in the compressor at least at one of the stages of the compressor for flow of vented compressed air from said flow channel, said rotor including spaced adjacent disks defining annular spaces into a least one of which the vented compressed air flows from said opening, and means defining a path for discharge of the vented compressed air from said at least one annular space after the compressed air has contacted the disks to effect thermal control thereof.

In this way, it is possible in relatively simple manner to substantially adapt the local temperature at the rim of the rotor disks to the local temperature at the hub of the rotor disk or vice-versa.

A particularly advantageous aspect of the invention is that a relatively small amount of compressed air in the flow channel of the compressor will be sufficient to establish a pressure difference to vent an adequate quantity of air for thermal control of the rotor.

By means of separate air chambers between two adjacent rotor disks, the vented air in the air chambers is subjected to circumferential velocity. Therefore, within the air chambers the air pressure is reduced, due to the rotational velocity, as compared to the pressure in the inner and outer annular spaces on opposite sides of the air chambers in which the air is not subjected to the rotational velocity. The reduction in pressure resulting from the construction of the air chambers thus makes it possible for the local tapping pressure for the control or "vent" air to be selected correspondingly lower or, stated in another way, the reduced pressure will provide a sufficiently high pressure difference at an outlet in the surface of the flow channel of the compressed air to vent the necessary quantity of control air.

BRIEF DESCRIPTION OF THE DRAWING

FIG. 1 is a longitudinal sectional view through a portion of a rotor of an axial flow compressor.

FIG. 2 shows on an enlarged scale a detail of a part of FIG. 1.

FIG. 3 is a sectional view taken along line III—III in FIG. 2.

FIG. 4 is a view similar to FIG. 1 of a modified embodiment.

DETAILED DESCRIPTION OF PREFERRED EMBODIMENT

Figure 5:
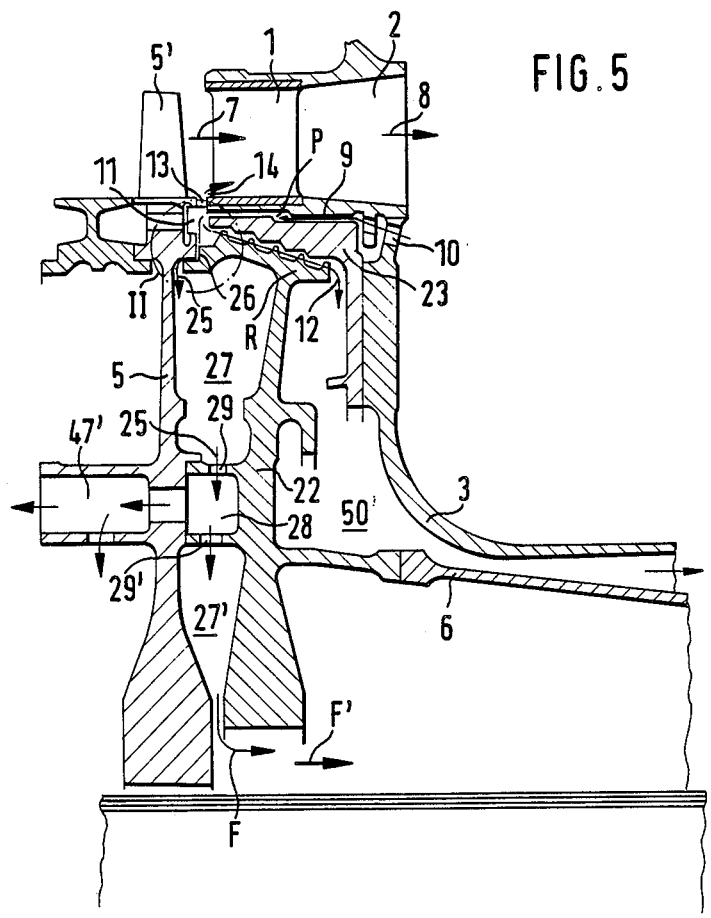
FIG. 5 is a view similar to FIG. 1 of another modified embodiment.

In the embodiments of the invention which are shown in FIGS. 1 to 5 and hereafter described in detail, the same structural elements are identified by the same reference numbers.

Referring to FIGS. 1 to 5, therein is seen a portion of the rotor of an axial flow compressor which comprises, as viewed in each case from left to right, adjacent rotor disks 36, 35 and 5 which respectively carry rotor vanes 36', 35' and 5'.

In FIG. 4 there are shown in dotted outline, stator vanes which precede the respective rotor vanes and designated respectively as $L_3$, $L_2$ and $L_1$. In each embodiment, the last rotor disk 5 is connected to a supporting disk 22 which is axially downstream thereof and which includes in its outer circumferential region an integral rotating part R serving as a portion of the rotor main seal which is, for example, of labyrinth type.

As shown in FIGS. 1 and 4, the rotor has intermediate rings 37 and 38 in its outer circumferential region which keep the individual rotor disks 5, 35 and 36 spaced apart axially. The intermediate rings 37 and 38 each have laterally open recesses A, B which adjoin the adjacent disks and are covered thereby.

Located radially inwards of the rings 37 and 38 are outer and inner wall sections D2, D3 and D2', D3' respectively, which serve as axial spacers and which respectively define air chambers 28, 47 and 48. By means of the air chambers 28, 47 and 48 and their corresponding wall sections, the intermediate spaces between the adjacent rotor disks 5, 35 and 36 are divided into outer and inner annular spaces 45, 45' and 46, 46'. The same applies analogously in respect of the arrangement of the last rotor disk 5 and the axially spaced supporting disk 22 therebehind which define outer and inner annular spaces 27 and 27' respectively.

The intermediate rings 37 and 38 are constructed so that their outer peripheral and radial side surfaces are flush and axially aligned with corresponding root portions 5", 35" and 36" of the rotor vanes 5', 35' and 36'. In accordance with the invention, a portion of the compressed air which flows axially in the annular flow channel of the compressor is removed for thermal control of the rotor disks by heat exchange therewith. The air which is removed from the flow channel travels generally radially inwards as shown by arrows 25, 39 and 42 in FIGS. 1 and 4. The air flows from the flow channel as leakage air between the adjoining edges of the intermediate rings 37 and 38 and the root portions 5", 35" and 36" of the rotor vanes. The removed air then passes via the hollow spaces A in the intermediate rings 37 and 38 to inlet openings 40 and 43 of elongated slit shape which are formed in the inner rear flanges of the rings between the central radial web of the rings and their rear radial edges which face adjoining rim portions of the rotor disks. The removed air which serves as control air flows from the openings 40 and 43 into the outer annular spaces or chambers 45 and 46 respectively. The control air then flows through holes 41 and 44 formed in the outer wall sections D2 and D3 into the corresponding air chambers 47 and 48. The air chambers are divided circumferentially by a number of radial webs 100 to form separate subchambers, each having a respective hole 41, 44 such that within air chambers 47 and 48 the compressed air is imparted with the circumferential velocity of the rotor. Each of the inner wall sections D2' and D3' respectively of the air chambers 47 and 48 has outlet holes 41' and 44' from which the control air flows in the direction of the arrows against the relatively thick inner portions or hubs of the corresponding rotor disks 5, 35 and 36 and then axially around the inner surfaces of the disks in the direction of arrow F. The entire amount of the removed air then flows in the direction of arrow F' for discharge, under the preestablished pressure gradient of the aerothermodynamic cyclic process, for other use, for instance, as sealing air or for turbine cooling purposes in a combined compressor-turbine-rotor system.

From FIGS. 1 and 4 it can furthermore be seen that the sealing portion R of the supporting disk 22 serves as an axial spacer between the last rotor disk 5 and the supporting disk 22. The construction and arrangement of the main rotor seal for the removal of control air along arrow 25 in FIG. 5 will be discussed in greater detail later with reference to FIG. 5.

The embodiment of FIG. 4 differs from the embodiment of FIGS. 1 to 3 primarily by the provision of outer openings 40' and 43' between the rear radial edges of the outer flange of the intermediate rings 37 and 38 and the adjoining root portions 35" and 5" of the rotor vanes. The openings 40' and 43' are intended to provide a defined flow section as distinguished from the leakage flow in FIG. 1. Another difference from FIG. 1 is the provision of the inlet openings 40" and 43" in the lower flange of the rings 37 and 38 again to provide a defined flow section as compared to leakage flow in FIG. 1.

In similar manner, both FIGS. 1 and 4 have corresponding flow paths for removal air associated with a respective intermediate stage of the compressor, i.e. between the guide vanes $L_1$ and the rotor blades 5'. The corresponding removed air stream 39 or 22 is then fed in the manner already described with respect to FIG. 1, via the outer spaces 45 and 46 to the air chambers 47 and 48 and then to the corresponding inner spaces 45' and 46'.

In accordance with FIGS. 1. and 4, the venting of the compressed air flow channel to obtain the control air can therefore be distributed as desired over the rotor disk portions. In this respect, it is generally a prerequisite that for the supply of the removed or vent air to the regions of the rotors which lie relatively upstream, a sufficiently high air pressure in the flow channel of the compressor is necessary. Therefore, the inlet temperature of the removed air corresponds substantially to the temperature of the air prevailing at the hub portions of the rotor. In this way, in the embodiments of FIGS. 1 to 4, an optimal venting and thermal control of the corresponding portions of the rotor disks is obtained which is characterized by temperature equalization between the hub portions of the disks and their corresponding rims both for uniform and non-uniform operations.

In this regard, it can be noted further that, particularly with respect to the construction in FIG. 1, it is necessary to provide measured flow paths for the removed air at 26, 40 and 43, in accordance with the pressure increase of the compressed air in the direction of the main flow in the compressor in order to keep the air pressures within the chambers 27, 28; 45, 47; and 46, 48 as low as possible and still achieve sufficient venting at the most upstream location at 43. During operation over a period of time, the inlet cross sections for the removal or control air may vary slightly due to wear on the contact surfaces between the parts 37 and 38 and the rotor disks. The pressures between the rotor chambers and air chambers 28, 17 and 48 can in this regard be balanced out by holes 49 and 50 in the rotor disks 5 and 35.

The air chambers 28, 47 and 48 are preferably distributed uniformly over the circumference of the rotor disk and are separated from each other, for example, by radial webs.

In FIG. 5 there is seen an axial diffuser 2 which communicates with a combustion chamber (not shown) of a power plant. The diffuser 2 is located downstream of guide vanes 1 at the last stage of the compressor. The axial diffuser 2 and the guide vanes 1 are connected as a unit and arranged radially outwards of a stationary part 23 of the main rotor seal which, in turn, is radially outwards of seal support R on the supporting disk 22. An annular channel 11 is formed between adjoining portions of the stationary and rotating parts of the main seal and rear face of the rim of the disk 5 and the root portion of the vanes. The annular channel 11 communicates with an annular slot 13 which opens into the main channel for the flow of compressed air in the compressor between the rotor vanes 5' and the stator vanes 1 of the last compressor stage. The annular channel 11 is also connected by a passage P and holes 10 with the region downstream of diffuser 2 to receive vented compressed air 9 therefrom. Therefore, air which flows from channel 11 past the main seal as well as into the annular space 27 between the last rotor disk 5 and supporting disk 22 will be composed of vented compressed air from the outlet of the diffuser.

From FIG. 5, in combination with the above figures and in particular in accordance with FIG. 2, it can be seen that the annular channel 11 can be connected via compressed air feed openings or slots 26 to the annular spaces 27 and 27' respectively. According to FIGS. 2 and 5, therefore, the slots or openings 26 are formed between the front end surfaces of the rotating sealing portion and the adjoining mating surfaces of the last rotor disk 5.

Furthermore, the distribution, number and size of the holes 10 for supply of compressed air can be selected as a function of the desired amount of vent air 9 to flow in passage P.

In this respect, the radial position of feed holes 10 from the axis of rotation of the rotor should correspond to the radial position of maximum locally developed air friction.

In accordance with FIG. 5. it is furthermore advantageous for the local slit shaped entrance openings 26 to be arranged in the region between the last rotor disk 5 and the supporting disk 22 so that the supporting disk 22 can be closed at the rear. A decisive advantage of the relatively far radially outwardly displaced inlet openings 26 is that the supply of removal or control air can be made as independent as possible of the secondary air heating by air friction and, furthermore, independent of the slot behavior of the labyrinth main rotor seal.

In FIG. 5, it is further noted that the passage P is formed between the stationary part 23 of the main seal and the inner wall surface of the unit composed of the axial stator vanes 1 and the axial diffuser 2.

The following advantages are obtained by the embodiment of FIG. 5.

The pressure within the annular channel 11 is equalized through the annular slot 13 with the pressure of stream 7 at the rotor outlet.

The feed holes 10 in combination with passage P provide a sufficient supply in the annular channel 11 of compressor outlet air in stream 9 due to the greater pressure between the stream 7 about to enter the stator vanes 1 and the stream 8 leaving the diffuser.

A portion of the amount of air present in the annular channel 11 flows as leakage air stream 12 into an adjoining space 50', for instance, of the turbine secondary air system. Another portion 14 is recycled through the annular slot 13 to the primary air stream in the compressor for flow to the guide vanes and the diffuser 2 under the suction pressure of the primary air stream and portion 14 undergo rapid acceleration to the speed of the primary air stream.

FIG. 5 differs further from FIGS. 1 and 4 in that venting can take place for thermal control of rotor disk 5 opposite the direction of the main flow in the compressor, namely from the rear to the front in the air chambers 28 and 47' respectively.

In accordance with FIGS. 2 and 3, the formation of the slit shaped inlet openings 26 can be effected at the separation location between the rotor disk 5 and the supporting disk 22 in one or both of the structural parts.

The dimensioning of the corresponding inlet openings 26, such as the maximum slit length 30 (FIG. 3), the maximum depth of recess 31, the size of radii 32 and 33 and the peripheral distribution or spacing 34 between adjacent slits 36 is based on strength requirements. The maximum cross section determines the largest quantity of removal or control air 25 and thus the pressures in the annular spaces 27 and 27' as well as in the air chamber 28 within the rotor.

Within the aforementioned annular chamber 27 (FIGS. 1 and 5) the inward flowing quantity of air 25 additionally produces a cooling of the supporting disk 22 which is heated from the outside by air friction. The stream of air 25 then flows through the outer chamber openings 29 into the corresponding air chambers 28 between the supporting disk 22 and the rotor disk 5. Hereat, there is a further division of the stream of air 25, i.e. the removal or control air flows via the radially inward holes 29' out of the corresponding air chambers 28 into the inner annular space 27' which is essentially formed between the relatively thick hub portions of the rotor disk 5 and the support disk 22.

In FIG. 5 it should be further noted that the structural part 3 may be an inner structural portion of the external housing of the combustion chamber and preferably an annular combustion chamber. In other words, the amount of air in stream 9 fed through the holes 10 can be supplied from an intermediate space in a wall of the housing between the combustion chamber and the structural part 3. In accordance with the invention, however, it is possible for the holes 10 to communicate with the annular space between spaced walls of the combustion chamber, the annular space being applied with a portion of the secondary air of the combustion chamber downstream of the diffuser 2.

Although the invention has been described in relation to specific embodiments thereof, it will become apparent to those skilled in the art the numerous modifications and variations thereto can be made within the scope and spirit of the attached claims.

What is claimed is:

1. Apparatus for optimizing the clearance between the vanes and adjoining structure in a multi-stage axial flow compressor of a gas turbine power plant by thermally controlling the disks of the rotor of the compressor by compressed air vented from the compressor, said compressor having a flow channel in which compressed air passes through the successive stages of rotor and stator vanes, the flow channel having an inner bounding surface which is provided with an opening in at least one stage of the compressor for flow of vented compressed air from said flow channel, said rotor including spaced adjacent disks comprising outer rim portions including said rotor vanes and inner hub portions and further defining annular spaces into at least one of which the vented compressed air flows from said opening, said means defining a path for discharge of the vented compressed air from said at least one annular space after the compressed air has contacted the disks at said inner hub portions for effecting thermal control thereof so that the local temperature at said inner hub portions is adapted to the local temperature at said respective outer rim portions of said disks.

2. Apparatus as claimed in claim 1 wherein said opening is located between adjacent rotor and stator vanes of said one stage of the compressor.

3. Apparatus as claimed in claim 2 comprising intermediate rings between adjacent rotor disks cooperating with root portions of said rotor vanes to form said inner bounding surface of said flow channel.

4. Apparatus as claimed in claim 3 wherein said opening is formed between adjoining surfaces of one of the intermediate rings and the root portion of the adjacent rotor vane.

5. Apparatus as claimed in claim 4 wherein said one intermediate ring has upstream and downstream surfaces relative to the direction of flow of the compressed air in said flow channel, said opening being formed at said downstream surface.

6. Apparatus as claimed in claim 5 wherein each of said intermediate rings has hollow spaces in its upstream and downstream surfaces which open laterally outwards towards the adjacent rotor disks, each said ring having a radial web separating said spaces, said opening being in communication with a respective hollow space.

7. Apparatus as claimed in claim 6 wherein said downstream surface of said one intermediate ring forms clearances with the adjacent rotor disk at a location radially outward of said hollow space, the vented compressed air flowing from said flow channel through said outwardly located clearance into said hollow space and therefrom into said one annular space between the adjacent rotor disks.

8. Apparatus as claimed in claim 7 comprising axial spacer means between adjacent disks located radially inwards of said intermediate rings and defining inner and outer portions for said annular spaces between adjacent disks, said spacer means comprising inner and outer annular walls defining an air chamber therebetween, said inner and outer walls having holes providing communication between the inner and outer portions of said annular spaces and said air chambers.

9. Apparatus as claimed in claim 8 wherein said disks have holes therein which establish communication between adjacent air chambers to equalize the pressures therein.

10. Apparatus as claimed in claim 1 wherein said compressor includes an axial flow diffuser located downstream of the stator vanes at the last compressor stage for supplying compressed air to a combustion chamber of the power plant, a main rotor seal through which leakage air passes from the last stage of the compressor before the diffuser, said rotor seal including a stationary portion secured to the diffuser and the stator vanes at the last stage of the compressor and a rotary portion including a support disk downstream of the last rotor disk of the compressor and secured for rotation therewith, and a circumferential portion facing said stationary portion and serving as a spacer between said support disk and said last rotor disk, said stationary and rotary portions of said seal defining with said last rotor disk an annular channel which communicates with said flow channel via an annular slot provided in said flow channel between the rotor and stator vanes of the last compressor stage, and passage means connecting said annular channel with the diffuser at the outlet thereof for supply of compressed air at the outlet of said diffuser to said annular channel, said support disk and said last rotor disk defining an annular space therebetween connected to said path for the discharge of vented compressed air, the latter said annular space being connected to said annular channel for receiving compressed air therefrom.

11. Apparatus as claimed i claim 10 wherein the last rotor disk has a downstream surface facing an upstream surface of said spacer of the rotary portion of the main seal, at least one of said surfaces having openings therein for flow of compressed air from said annular channel to said annular space.

12. Apparatus as claimed in claim 11 wherein said openings in said at least one surface are slots.

13. Apparatus as claimed in claim 10 wherein said combustion chamber has a bounding wall and said passage means is constituted by holes provided in said wall, and a guide channel connected to said holes and formed between said stationary portion of the main seal and the diffuser and stator vanes at the last compression stage.

14. Apparatus as claimed in claim 13 wherein said holes are present in a number and size to serve as means for controlling the amount of compressed air supplied from the outlet of the diffuser to said annular channel.

15. Apparatus as claimed in claim 14 wherein said holes are radially located relative to the axis of rotation of the rotor substantially where maximum air friction takes place.

16. Apparatus as claimed in claim 7 wherein said one intermediate ring has a hole therein connecting its respective hollow space with said one annular space.

17. Apparatus as claimed in claim 16 wherein said hole is of oval cross section.

18. A method of optimizing the clearance between rotor vanes and adjoining structure in a multi-stage axial flow compressor of a gas turbine power plant by effecting thermal control between the hubs and the rims, including the vanes of the rotor disks of the compressor, said method comprising:
venting compressed air from the flow channel of the compressor at least at one of the stages thereof between adjacent rotor vanes of the rotor;
conveying the vented compressed air inwardly into an annular space between adjacent rotor disks of the respective rotor vanes to equalize the temperature of the hubs and the rims of the rotor disks to effect thermal control thereof whereby to preserve and optimize the clearance between the vanes and the adjoining structure, and
discharging the vented compressed air from said annular space for further utilization thereof.

19. A method as claimed in claim 18 wherein the vented compressed air is conveyed inwardly to said annular space through passages formed between intermediate rings and adjacent rotor disks.

20. A method as claimed in claim 19 wherein said compressor has a main rotor seal through which leakage air passes, said seal including a stationary portion and a rotary portion attached to a support disk spaced downstream at the last rotor disk to form a further annular space therewith, said method further comprising:
supplying to said further annular space compressed air from the outlet of the compressor.

21. A method as claimed in claim 20 wherein the vented compressed air flows inwardly along said rotor disks over said hubs which are relatively thick and then axially for discharge in the same direction of flow of the compressed air in the flow channel of the compressor.

22. A method as claimed in claim 21 wherein the compressed air flowing from said further annular space is combined with the vented compressed air for combined discharge for further utilization.

* * * * *